(12) United States Patent
Morris

(10) Patent No.: US 8,397,675 B2
(45) Date of Patent: Mar. 19, 2013

(54) APPARATUS AND METHOD FOR LOADING AN ANIMAL FEEDER

(76) Inventor: Glenn E. Morris, Burnet, TX (US)

(*) Notice: Subject to any disclaimer, the term of this patent is extended or adjusted under 35 U.S.C. 154(b) by 1555 days.

(21) Appl. No.: 11/550,310

(22) Filed: Oct. 17, 2006

(65) Prior Publication Data

US 2008/0087223 A1    Apr. 17, 2008

(51) Int. Cl.
*A01K 39/00* (2006.01)
*A01K 5/00* (2006.01)

(52) U.S. Cl. .................... 119/57.91; 222/185.1

(58) Field of Classification Search ........... 119/57.91, 119/57.92, 72, 57.1; 222/53, 56; 141/8, 141/65, 67, 382; 220/567; 137/205, 588
See application file for complete search history.

(56) References Cited

U.S. PATENT DOCUMENTS

| | | | | |
|---|---|---|---|---|
| 2,654,557 | A * | 10/1953 | Henderson | 177/68 |
| 3,212,671 | A * | 10/1965 | Rock | 222/1 |
| 3,372,958 | A * | 3/1968 | Black | 406/15 |
| 3,659,748 | A * | 5/1972 | Beck | 222/56 |
| 3,799,622 | A * | 3/1974 | Hek | 406/23 |
| 4,311,492 | A * | 1/1982 | Eltvedt | 96/416 |
| 4,339,232 | A * | 7/1982 | Campbell | 417/54 |
| 4,376,451 | A * | 3/1983 | Bouron et al. | 137/588 |
| 4,501,518 | A * | 2/1985 | Smith | 406/25 |
| 4,527,714 | A * | 7/1985 | Bowman | 222/56 |
| 4,700,861 | A * | 10/1987 | Neward | 215/309 |
| 4,812,086 | A * | 3/1989 | Kopernicky | 406/153 |
| 5,033,914 | A * | 7/1991 | Wuertele et al. | 406/109 |
| 5,248,429 | A * | 9/1993 | Larsen | 210/767 |
| 5,791,830 | A * | 8/1998 | Fort et al. | 406/151 |
| 6,082,300 | A * | 7/2000 | Futch | 119/51.11 |
| 6,321,874 | B1 * | 11/2001 | Miyamoto | 184/1.5 |
| 6,341,628 | B1 * | 1/2002 | Burson | 141/67 |
| 6,622,653 | B1 * | 9/2003 | Starnes, Jr. | 119/51.01 |
| 6,827,529 | B1 * | 12/2004 | Berge et al. | 406/28 |
| 7,178,481 | B1 * | 2/2007 | Friesenhahn et al. | 119/57.91 |
| 2002/0185075 | A1 * | 12/2002 | Glover et al. | 119/57.91 |
| 2005/0205602 | A1 * | 9/2005 | Schmidt | 222/56 |
| 2007/0039553 | A1 * | 2/2007 | Friesenhahn et al. | 119/57.91 |

FOREIGN PATENT DOCUMENTS

DE    3728030 A1 *   3/1989

OTHER PUBLICATIONS

Helios Systems, Herolift (Vacuum hopper loader for powdered materials), 2006, http://www.helios-systems.com/powder-hopper-loader.htm.*

* cited by examiner

*Primary Examiner* — Joseph W Sanderson
*Assistant Examiner* — Valentina Xavier
(74) *Attorney, Agent, or Firm* — Kelly Kordzik; Matheson Keys & Kordzik PLLC

(57) ABSTRACT

A vacuum-based filling device allows a user to transfer quantities of heavy or difficult to manage materials from a dependent position into a delivery system or storage container at a higher elevation or less accessible position. This allows the person filling the delivery system or storage container to remain at a safe and convenient location while operating the vacuum-based filling system. For example, in the case of a feeder for animals, the user is able to fill the storage portion of the feeder from ground level without having to climb a ladder or other unsafe device in order to elevate the feed and place it into the feeder. The vacuum-based filling device uses a motor to create a vacuum within the storage container via a hose connected between the vacuum motor and storage container. Another hose is coupled between the storage container and a container holding the feed. The vacuum created within the storage container draws the feed from its container into the storage container.

30 Claims, 4 Drawing Sheets

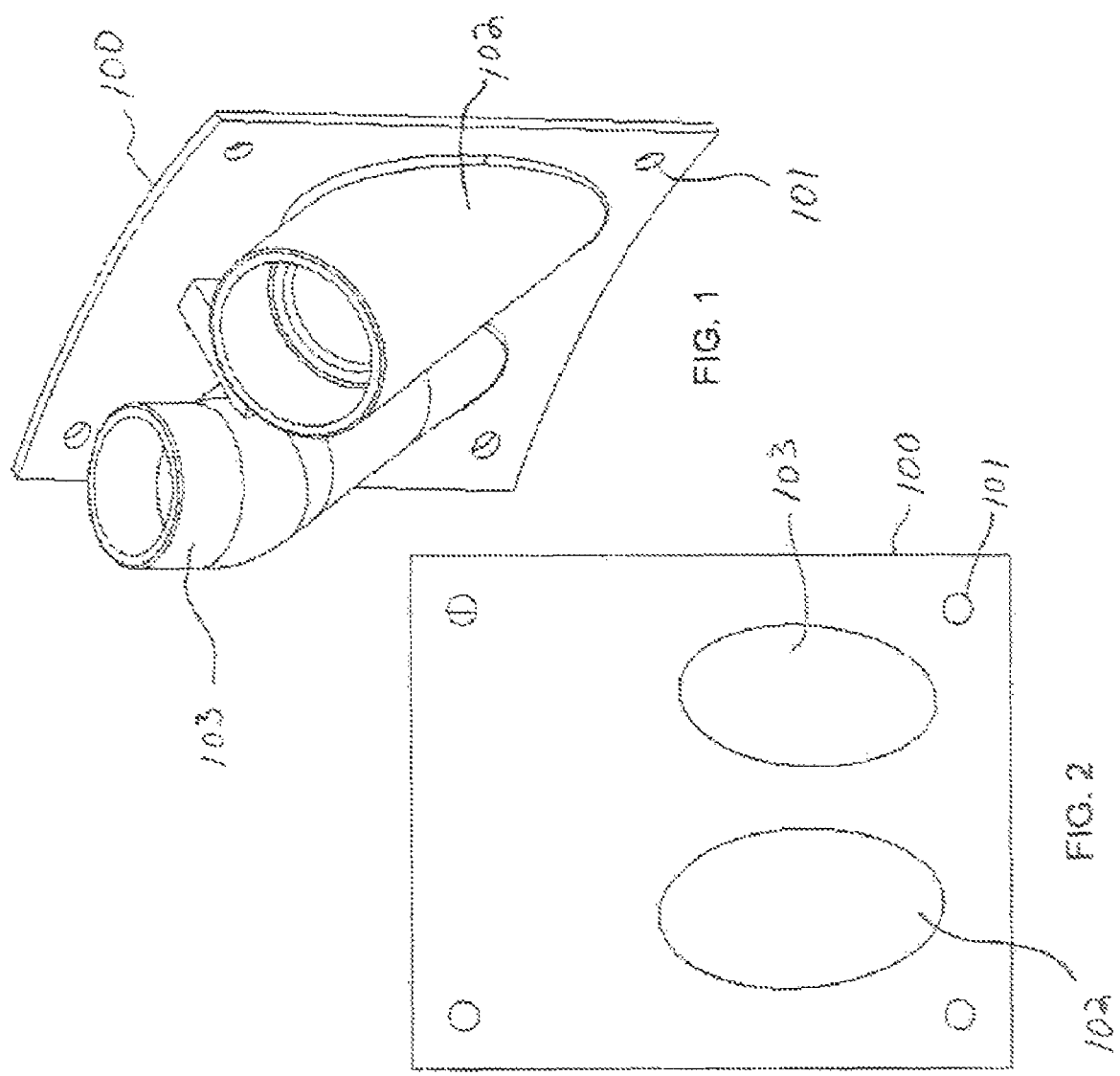

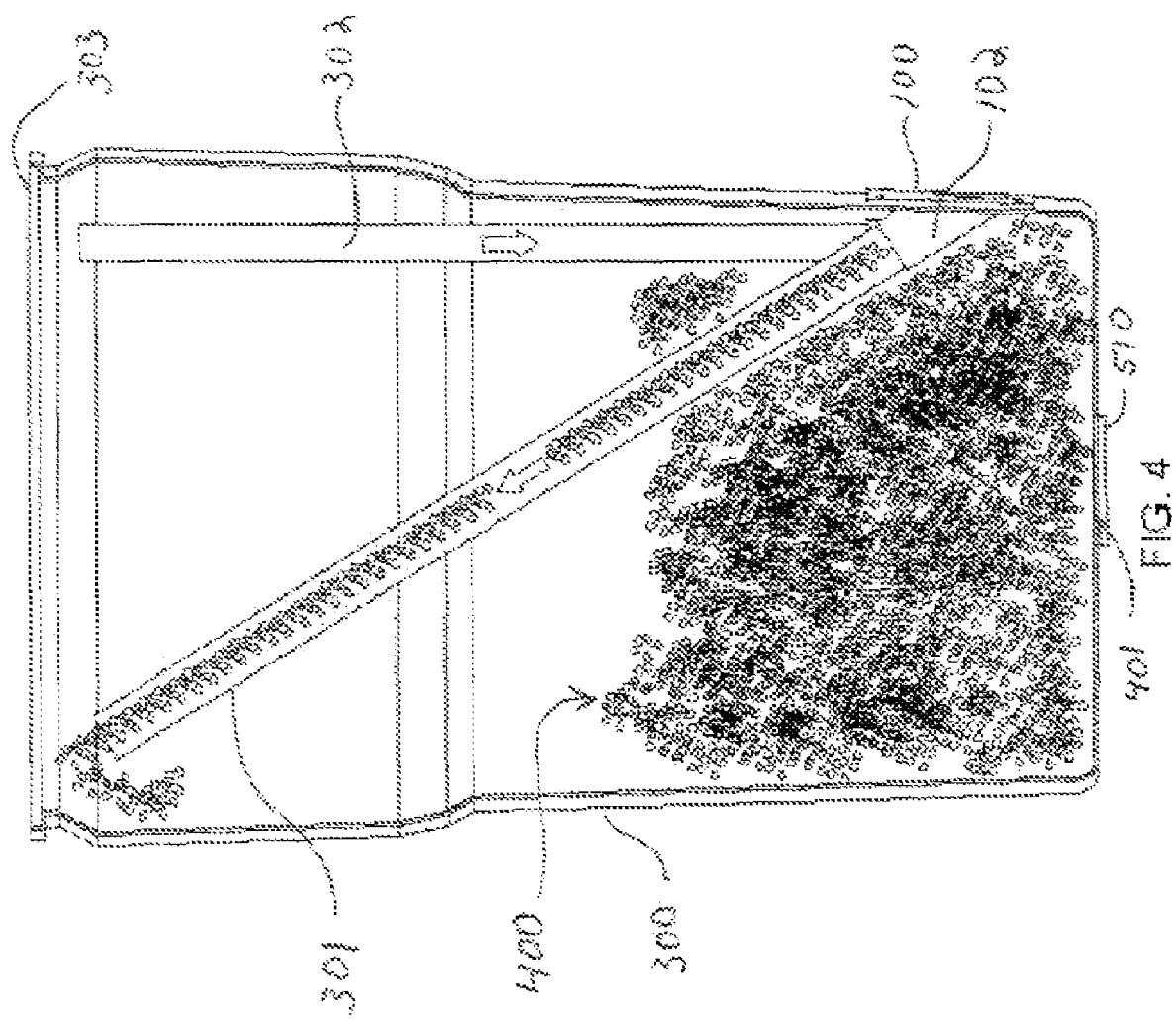

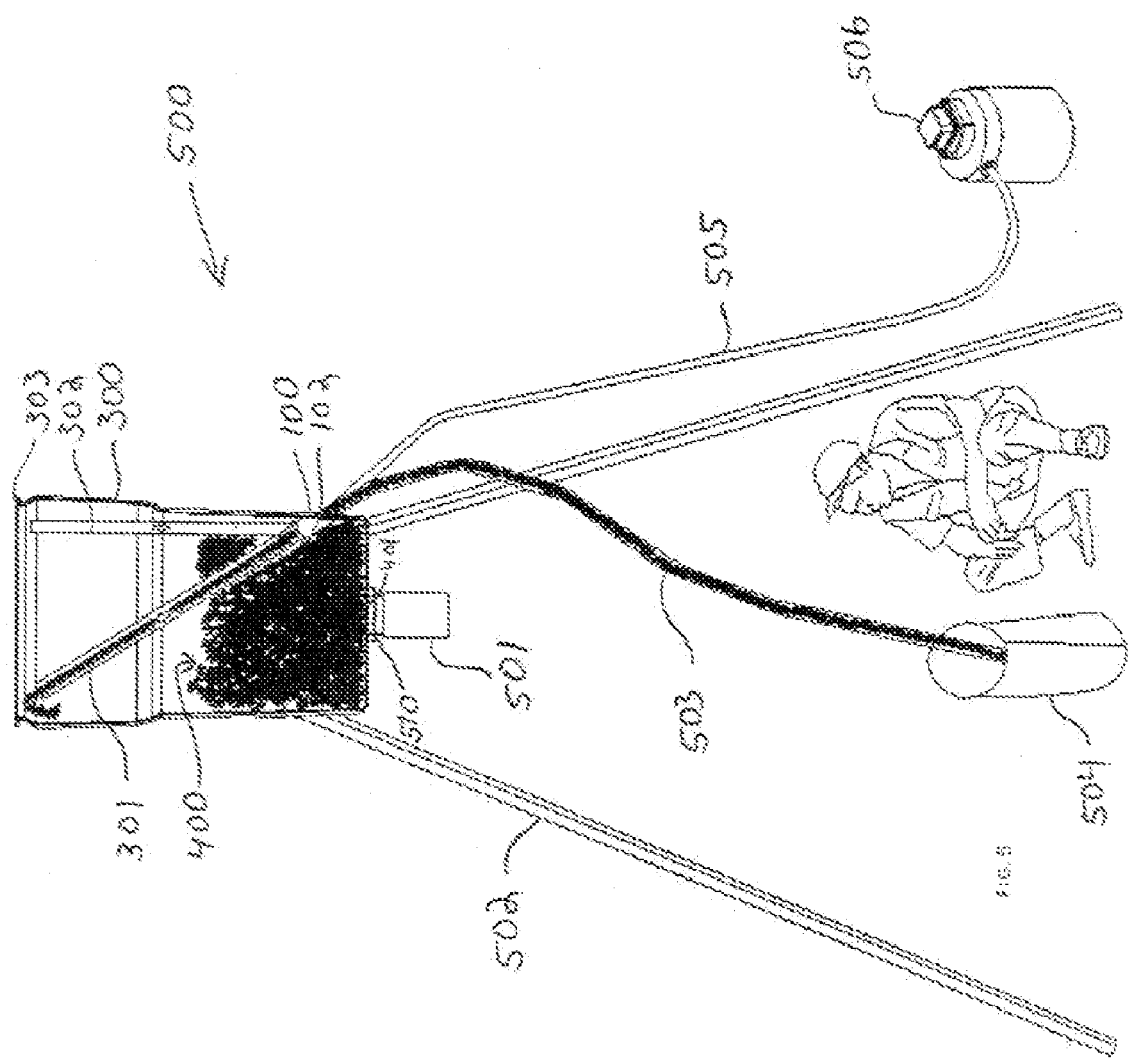

US 8,397,675 B2

APPARATUS AND METHOD FOR LOADING AN ANIMAL FEEDER

TECHNICAL FIELD

The present invention relates generally to the field of bulk filing or transfer of materials. More particularly, it concerns use of a vacuum or suction based system in accomplishing the transfer of the material. Still more particularly, the original design concerns transfer of corn or other materials (solid or liquid) into a feeder designed for feeding livestock or game animals.

Other applications would include transfer of any other bulk materials in a similar manner to the desired container or delivery system.

BACKGROUND

Deer hunting is a multi-million dollar sport, with some of the most expensive equipment and gear. For many years, hunters have utilized automatic deer feeders, which are timed to disperse various types of deer feed, such as corn, out of a container onto the ground to attract the deer to a desired hunting location. Such feeders are also used on farms and ranches to automatically feed livestock at designated times.

Generally, such feeders comprise a large barrel-like container in which the feed is stored, where the container is raised many feet from the ground through the use of tripod stilts or hung from a tree. At the bottom of the feed barrel, there is a hole through which the feed drops onto a timed and motorized dispenser, which is activated at desired times during the day and has a rotating fan-like mechanism to disperse the feed over a large area on the ground around where the feeder is located.

The problem with such feeders is the difficulty in replenishment of the feed into the barrel. The feed barrel has a lid that is tightly fastened to the barrel, which must first be removed. Then the person replenishing the feed into the barrel must pour the feed from a feed sack into the barrel. This can be especially problematic for those types of feeders that are raised from the ground on legs or stilts, since the person must position a tall ladder near the barrel, climb the ladder with a heavy feed bag (e.g., 50 pounds), unfasten the lid, and then hoist the bag so that the feed pours into the barrel. Many such barrels are fairly large, and this process may have to be repeated several times in order to fill the feed barrel. Furthermore, on large hunting ranches, this process may take several hours as the hunters travel around the property to each of the deer feeders to replenish the feed inside. As can be expected with such an endeavor, accidents can occur, and when they do, there is the issue that the injured person is far from a hospital.

Therefore, there is a need in the art for an improved apparatus and method for replenishing feed stock into an automatic feeder.

BRIEF DESCRIPTION OF DRAWINGS

FIG. 1 illustrates a perspective view of a flange configured in accordance with an embodiment of the present invention;

FIG. 2 illustrates another view of the flange;

FIG. 4 illustrates a process of replenishing feed into the feed barrel in accordance with an embodiment of the present invention; and FIG. 5 illustrates a process of replenishing feed into a barrel in accordance with an embodiment of the present invention.

DETAILED DESCRIPTION

Figure 3:
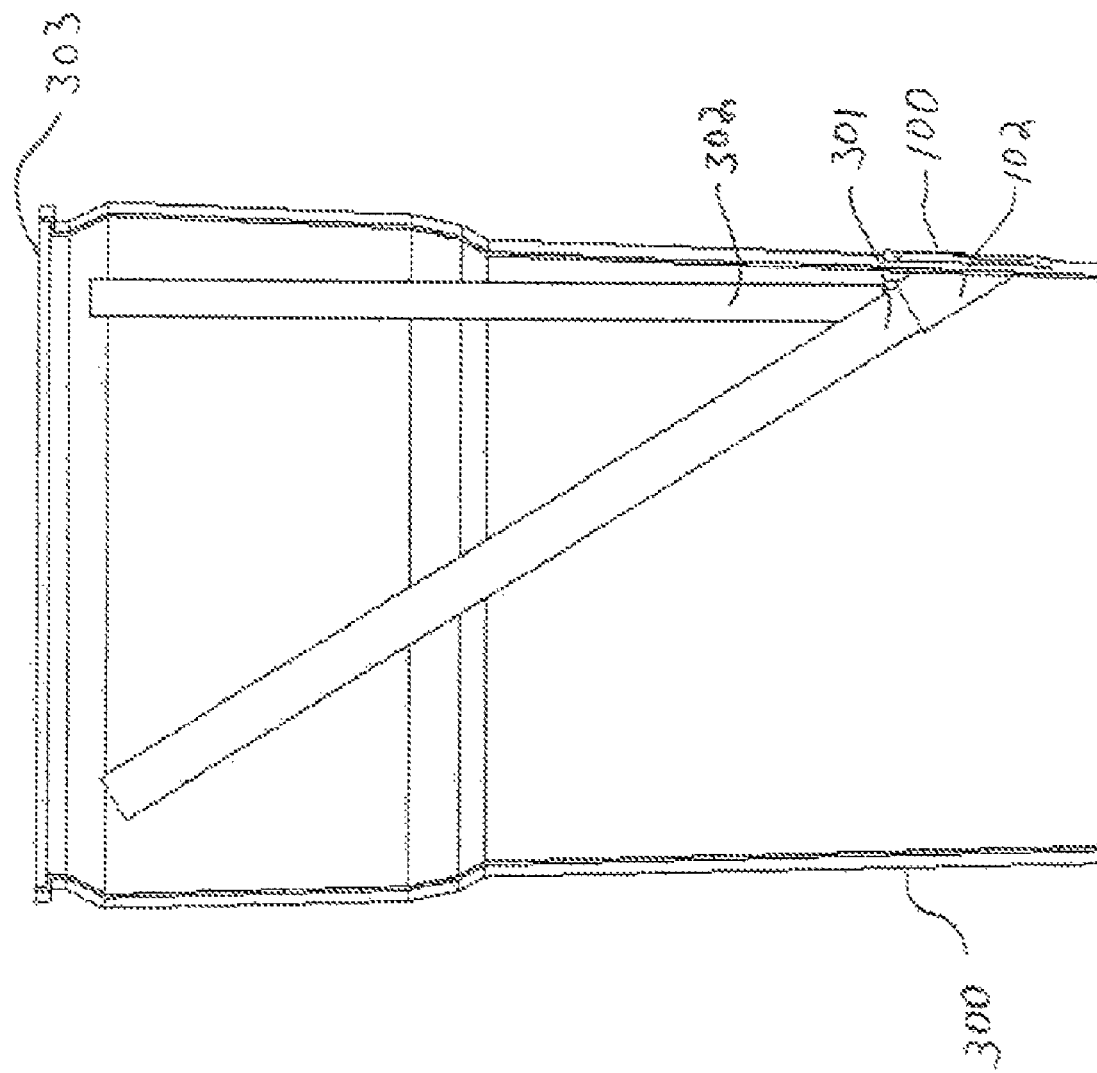
FIG. 3 illustrates a cut-away view of a feed barrel configured in accordance with an embodiment of the present invention.

FIG. 5 illustrates replenishment of feed 400 into a feed barrel 300 in accordance with an embodiment of the present invention. Embodiment 500 shows a feed barrel 300 raised from the ground on legs or stilts 502 as is well known in the art. Alternatively, such a feed barrel 300 could be hung from a tree or other apparatus including a man-made apparatus, as is known in the art. Such other embodiments are not shown, but are understood to be within the scope of the present invention.

Though not described in any further detail, feeder 500 includes a dispensing mechanism 501, which dispenses the feed 400 as it falls through the hole 401. This is also well-known in the art. As the feed 400 is dispensed, it needs to be replenished. The present invention utilizes a vacuum device 506, which may be a standard house or shop vacuum to create a vacuum inside of barrel 300 to thereby draw the feed 400 out of the feed sack 504 into the barrel 300.

Referring to FIG. 1, a flange 100 is fitted to a lower portion of the barrel 300 through an opening cut into the side of the barrel 300. The flange may be attached using screws or bolts 101. The flange 100 has two pipe-like openings or inlets that project inside the barrel, as illustrated in FIGS. 3-5. Note, two separate inlets further separated from each other may be utilized. From the outside of the barrel 300, the flange appears as it does in FIG. 2 with merely the openings to the two pipe-like fixtures 102-103. The flange may be made from a material similar to the outside material for the barrel 300, or it could be cast using other materials. Then, inside the barrel 300, the pipe-like fixtures are extended using cylindrical tubes or pipes 301 and 302, which could be made of any suitable material. This is in order that the flange can be installed at the lower portion of the barrel 300 while the effective openings for these orifices are towards the top of the barrel 300. As can be seen in FIGS. 4 and 5, this is so that the vacuum created through tube 302 is not obstructed by the feed filling up within the barrel 300, and so that the opening of the tube 301 is not also obstructed as it deposits the feed into the barrel 300 during the replenishment process. This also ensures that the feed does not fall out of the barrel 300 through the flange openings 102 and 103 after the feed has been replenished inside the barrel 300.

Returning to FIG. 5, when a person desires to replenish the feed 400 into a barrel 300, first a hose 505 (e.g., a hose typically used with such vacuum cleaners) is attached between the orifice 103 and an intake of the vacuum device 506. Another hose, 503 is attached to the orifice 102, and is then essentially used to vacuum the feed out of the feed sack 504 through the orifice 102, and the tube 301 into the barrel 300, as is better illustrated in FIG. 4. As can be seen in FIGS. 4 and 5, arrows are shown in tubes 301 and 302 to illustrate the direction of airflow within these pipes as created by the vacuum device 506. The vacuum device 506 operates to create airflow into the tube 302 from inside the barrel 300 thus creating a vacuum inside barrel 300, since it does have the lid 303 fastened thereon. This vacuum then is transferred down through tube 301 and inlet 102, through hose 503 in order to create a vacuum at the end of hose 503, which draws the feed 400 out of the sack 504 into the barrel 300. If a residual amount of feed 400 within the barrel 300 is not sufficient to block the opening 401 at the bottom of the barrel 300, a piece of cardboard or other object 510 may be optionally inserted over the hole 401 to block airflow from the surrounding atmosphere through the hole 401 when a vacuum is created within the barrel 300.

As the feed 400 fills inside the barrel 300, it will eventually reach the top of the tube 302, and thus be drawn into the hose 505 and the vacuum device 506. Upon hearing the drawing of such feed 400 into the vacuum device 506, the user will then know that the feed barrel 300 has been filled.

This entire process can thus be performed very quickly and without the use of a ladder as long as the person can reach the flange 100 to insert the hoses 503 and 505. This apparatus and method thus reduces the potential of injury and speeds up the replenishment process into the feeder.

A number of embodiments of the invention have been described. Nevertheless, it will be understood that various modifications may be made without departing from the spirit and scope of the invention.

What is claimed is:

1. A system for replenishing animal feed into an automatic feeder having a feed container configured for holding the animal feed, the system comprising:
    the automatic feeder comprising the feed container configured for holding the animal feed, the automatic feeder further comprising an opening in an underside of the feed container for passing the animal feed therethrough, the automatic feeder further comprising a dispensing mechanism in proximity to the opening for dispensing the animal feed externally from the feed container;
    a flange mounted on a side of the feed container, the flange having first and second holes;
    a first tube coupled to the first hole and projecting inside of the feed container;
    a second tube coupled to the second hole and projecting inside of the feed container;
    a first hose coupled to the first hole;
    a vacuum creating device; and
    a second hose coupled between the second hole and the vacuum creating device, wherein the first hose is configured for inserting into a receptacle storing the animal feed so that the vacuum creating device via the second hose causes a sufficient vacuum to be created within the feed container to draw the animal feed from the receptacle via the first hose into the feed container, wherein the first and second tubes are positioned inside of the feed container so that their open ends are proximate a top of the feed container so that the first tube does not become blocked by the animal feed until the feed container is nearly full of the animal feed, and so that the animal feed does not exit the feed container via the second tube until the feed container is nearly full of the animal feed, wherein the open ends of the first and second tubes are sufficiently positioned near opposite sides of the inside of the feed container so that the animal feed does not pass from the open end of the first tube to the open end of the second tube, but instead the animal feed drops from the open end of the first tube into the feed container.

2. The system as recited in claim 1, further comprising a cover for blocking the opening on the underside of the feed container in order to increase the vacuum within the feed container.

3. The system as recited in claim 1, wherein the flange is mounted to a lower portion of the iced container.

4. The system as recited in claim 1, wherein the feed container comprises an apparatus for positioning the feed container several feet above the ground.

5. The system as recited in claim 1, wherein the vacuum creating device comprises a standard house or shop vacuum.

6. The system as recited in claim 1, wherein the flange comprises two separate inlets separated from each other, wherein a first one of the two separate inlets is physically connected to the first hole, and wherein a second one of the two separate inlets is physically connected to the second hole.

7. The system as recited in claim 1, wherein the dispensing mechanism comprises a motorized dispenser configured to be activated at a specified time interval, wherein the motorized dispenser includes a rotating mechanism configured to disperse the animal feed over a large area on the ground around where the automatic feeder is located.

8. The system as recited in claim 1, wherein the first hose is configured with a first end free and unattached to another object until it is manually inserted into the receptacle storing the animal feed.

9. The system as recited in claim 8, wherein the first hose is configured for manual insertion into the first hole with a fit sufficient to enable the sufficient vacuum to be created within the feed container.

10. The system as recited in claim 1, wherein the receptacle storing the animal feed is a sack of the animal feed.

11. The system as recited in claim 1, wherein the first and second holes of the flange are physically separate from each other so that no air or animal feed is shared between the holes in the flange.

12. The system as recited in claim 1, wherein the flange comprises separate flanges for each of the first and second holes.

13. An animal feeding apparatus comprising:
    a feed container configured for holding animal feed, the feed container further comprising an opening in an underside of the feed container for passing the animal feed therethrough, the feed container further comprising a dispensing mechanism in proximity to the opening for dispensing the animal feed externally from the feed container;
    a flange mounted to a side of the feed container, the flange having first and second holes;
    a first tube connected to the first hole so that the first tube projects to an inside of the feed container; and
    a second tube connected to the second hole so that the second tube projects to the inside of the feed container, wherein the first and second tubes are positioned inside of the feed container so that their open ends are proximate a top of the feed container so that the first tube does not become blocked by the animal feed until the feed container is nearly full of the animal feed, and so that the animal feed does not exit the feed container via the second tube until the feed container is nearly full of the animal feed, wherein the open ends of the first and second tubes are positioned near opposite sides of the inside of the feed container so that the animal feed does not pass from the open end of the first tube to the open end of the second tube, but instead the animal feed drops from the open end of the first tube into the feed container.

14. The animal feeding apparatus as recited in claim 13, wherein the flange is mounted to a lower portion of the feed container.

15. The animal feeding apparatus as recited in claim 13, wherein the feed container comprises a plurality of long stilts for positioning the feed container more than five feet above the ground.

16. The apparatus as recited in claim 13, further comprising a standard house or shop vacuum having a first hose configured for manual insertion into the first hole, and further comprising a second hose configured for manual insertion into the second hole.

17. The apparatus as recited in claim 16, wherein the first and second hoses have diameters consistent with those used on a standard house or shop vacuum device.

18. The apparatus as recited in claim 13, wherein the flange comprises two separate inlets separated from each other, wherein a first one of the two separate inlets is physically connected to the first hole, and wherein a second one of the two separate inlets is physically connected to the second hole.

19. The apparatus as recited in claim 13, wherein the dispensing mechanism comprises a motorized dispenser configured to be activated at a specified time interval, wherein the motorized dispenser includes a rotating mechanism configured to disperse the animal teed over a large area on the ground around where the automatic feeder is located.

20. The apparatus as recited in claim 13, wherein the flange comprises one or more flanges having the first and second holes physically separate from each other.

21. An apparatus for enabling replenishment of dry animal feed within an automatic animal feeder, comprising:
   a flange configured for mounting to a side of the automatic animal feeder, the flange having first and second inlets configured for coupling to vacuum cleaner size hoses;
   a first tube configured for connecting to the first inlet on an inside of the automatic animal feeder; and
   a second tube configured for connecting to the second inlet on the inside of the automatic animal feeder, the first inlet of the flange and the first tube configured for ease of passage of a bulk amount of the dry animal feed, wherein the first and second inlets of the flange are configured so that the first and second tubes are both angled upwards inside of the automatic animal feeder when the flange is mounted to the side of the automatic animal feeder, wherein both of the first and second tubes have sufficient lengths so that their distal ends are in proximity to a top portion of the automatic animal feeder when their proximate ends are coupled to the first and second inlets of the flange, respectively, when the flange is mounted to the side of the automatic feeder, wherein the first and second inlets of the flange are configured so that the distal ends of the first and second tubes are positioned near opposite sides of the inside of the automatic animal feeder when the flange is mounted to the side of the automatic animal feeder.

22. The apparatus as recited in claim 21, wherein the vacuum creating device comprises a standard house or shop vacuum.

23. The apparatus as recited in claim 21, wherein the first and second inlets are separated from each other.

24. The apparatus as recited in claim 21, the automatic animal feeder further comprising a dispensing mechanism in proximity to an opening in the automatic animal feeder for dispensing the animal feed externally from the automatic animal feeder, wherein the dispensing mechanism comprises a motorized dispenser configured to disperse the animal feed over a large area on the ground around where the automatic animal feeder is located.

25. A system for replenishing dry animal feed pellets into an automatic feeder having a feed container for holding the dry animal feed pellets, the system comprising:
   the automatic feeder comprising the feed container for holding the dry animal feed pellets, the automatic feeder further comprising a hole in an underside of the feed container for passing the dry animal feed pellets therethrough due to a force of gravity on the dry animal feed pellets, the automatic feeder further comprising a dispensing mechanism in proximity to the hole for dispensing the dry animal feed pellets externally from the feed container;
   a flange mounted on a side wall of the feed container, the flange having first and second inlets for providing open channels between an inside of the feed container and an outside of the feed container;
   a first tube having a first proximate opening and a first distal opening, the first proximate opening coupled to the first inlet of the flange so that the first tube projects inside of the feed container so that the first distal opening of the first tube is positioned near a topside of the feed container;
   a second tube having a second proximate opening and a second distal opening, the second proximate opening coupled to the second inlet of the flange so that the second tube projects inside of the feed container so that the second distal opening of the second tube is positioned near the topside of the feed container but distant from the first distal opening of the first tube;
   a first flexible hose having a third proximate opening and a third distal opening, the third proximate opening coupled to the first inlet of the flange;
   a vacuum, creating device; and
   a second flexible hose having a fourth proximate opening and a fourth distal opening, the fourth proximate opening coupled to the second inlet of the flange and the fourth distal opening coupled to a vacuum intake of the vacuum creating device, whereby a partial vacuum is created within the inside of the feed container via a first airway established from the second distal opening of the second tube through the second tube, the second inlet of the flange, and the second flexible hose to the fourth distal opening of the second flexible hose when a partial vacuum is created at the vacuum intake by the vacuum creating device, and wherein the first flexible hose is configured for insertion of the fourth distal opening into a receptacle storing the dry animal feed pellets so that the partial vacuum created within the feed container draws the dry animal feed pellets from the receptacle into the feed container via a second airway established from the second distal opening of the second tube through the second tube, the second inlet of the flange, and the second flexible hose to the fourth distal opening of the second flexible hose.

26. The system as recited in claim 25, wherein the vacuum creating device comprises a standard house or shop vacuum.

27. The system as recited in claim 25, wherein the open channels of the first and second inlets are physically separated from each other.

28. The system as recited in claim 25, wherein the dispensing mechanism comprises a motorized dispenser configured to be activated at a specified time interval, wherein the motorized dispenser includes a rotating mechanism configured to disperse the animal feed over a large area on the ground around where the automatic feeder is located.

29. The system as recited in claim 25, wherein the fourth distal opening is configured to be free and unattached to another object until it is manually inserted into the receptacle storing the dry animal feed pellets.

30. The system as recited in claim 25, wherein the receptacle storing the dry animal feed pellets is a sack of the dry animal feed pellets.

* * * * *